United States Patent [19]
Florsheim, Jr. et al.

[11] 3,712,730
[45] Jan. 23, 1973

[54] AUTOMATIC DENSITY SETTING APPARATUS

[75] Inventors: Leonard S. Florsheim, Jr., Lake Forest, Ill.; Harold B. Archer, Philip F. LoPresti, both of Henrietta, N.Y.; Thurlow J. Sutherland, Rochester, N.Y.

[73] Assignee: Enivar Enterprises Inc., Chicago, Ill.

[22] Filed: March 22, 1971

[21] Appl. No.: 126,463

Related U.S. Application Data

[62] Division of Ser. No. 786,280, Dec. 23, 1968, Pat. No. 3,611,159.

[52] U.S. Cl. .................355/69, 235/184, 328/129
[51] Int. Cl. ..........................................G03b 27/76
[58] Field of Search........95/10 R, 10 CT; 250/214 P; 235/184, 185; 307/293; 328/129, 271; 355/35, 69, 115; 356/202

[56] References Cited

UNITED STATES PATENTS

| | | |
|---|---|---|
| 2,795,168 | 6/1957 | Bauer .................................95/10 X |
| 2,921,498 | 1/1960 | Simmon et al...................235/184 X |
| 3,074,312 | 1/1963 | Olson ................................356/202 |
| 3,227,039 | 1/1966 | Simmon..........................235/184 X |
| 3,233,116 | 2/1966 | Watrous............................307/293 |

Primary Examiner—Samuel S. Matthews
Assistant Examiner—Michael L. Gellner
Attorney—Hill, Sherman, Meroni, Gross & Simpson

[57] ABSTRACT

An automatic density setting apparatus for converting copy densities into exposure times for main, flash and bump exposures required in half-tone reproduction. Two separately prepositionable scales of an evaluator are set to store intelligence mechanically corresponding to highlight and shadow densities of material to be copied. A master control unit converts the mechanical settings into appropriate electrical signals for automatically regulating the camera lights, and auxiliary flash lamp and the shutter of a process camera in order to automatically and instantaneously provide properly exposed main, flash and bump exposures.

7 Claims, 10 Drawing Figures

AUTOMATIC DENSITY SETTING APPARATUS

RELATED APPLICATIONS

This application is a division of our parent application Ser. No. 786,280 filed Dec. 23, 1968, now U.S. Pat. No. 3,611,159.

BACKGROUND OF THE INVENTION

1. Field of the Invention

This invention relates in general to photography and in particular to automatic apparatus that allows various exposures to be set automatically.

2. Description of the Prior Art

In half-tone photography images are converted to dots of different sizes. There are three separate exposures of a film which are made during the production of a half-tone. These are the highlight "bump" exposure which is through the lens to the image without a half-tone screen. The main exposure is through the lens to the subject with the half-tone screen in place. The third exposure is the flash exposure in which the photographic film is exposed to non-image light directly and is not necessarily a through-the-lens exposure. The times for these three exposures are normally calculated by measuring the highlight density and the shadow density of the copy, and then calculating the various exposures from these measurements. The difference between highlight and shadow densities is called the density range.

The density range of the copy decreased by a fixed quantity, which is dependent upon camera, screen, film and other conditions, determines the excess density range. The excess density range determines the time for the flash exposure and the highlight density determines the time for the main exposure. The highlight exposure is often expressed as a percentage of the main exposure. In the prior art the highlight density and the shadow density have been measured and the various exposures have been estimated or calculated from these values. Since these calculations are fairly complicated, highly trained employees must be used and there is a possibility of errors being made in hight-production operations the time required for these calculations and for trial-and-error shots represent significant cost and time delay.

SUMMARY OF THE INVENTION

Apparatus for automatically calculating various exposures for making half-tone or similar types of images, is disclosed. Different exposures having different times are required in half-tone photography and the exposure times are calculated from the highlight density and the shadow density. The measurement of these factors and the computation for determining the particular exposure times is a complicated process and time consuming. The present invention utilizes shadow density and highlight density scales which have a number of discrete steps that are compared by an operator with the highlight and shadow portion of an image. The selection of particular shadow and highlight densities automatically controls the times for the various exposures without further computation by the operator.

Thus, after the operator has selected the highlight and shadow density values he may immediately proceed to make the exposures and produce the half-tone.

The operator does not have to make a reading and then set a dial or do any computation, in that the present apparatus automatically calculates the correct exposure times after the shadow and the highlight density readings are made.

Since the control and timing units may be bulky, the highlight and shadow densities may be obtained with a small unit that may be connected to the main apparatus with a flexible cable or, in certain embodiments, may be inserted into the master unit after the highlight and shadow density settings have been made on the copy at a remote position.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 4 is a electrical schematic of the invention with FIG. 4a and 4b comprising the electrical schematic of the master timer and the control unit, and FIGS. 4c and 4d comprising the electrical schematics of the timing resistor selecting means of the evaluator;

DESCRIPTION OF THE PREFERRED EMBODIMENTS

Figure 1:
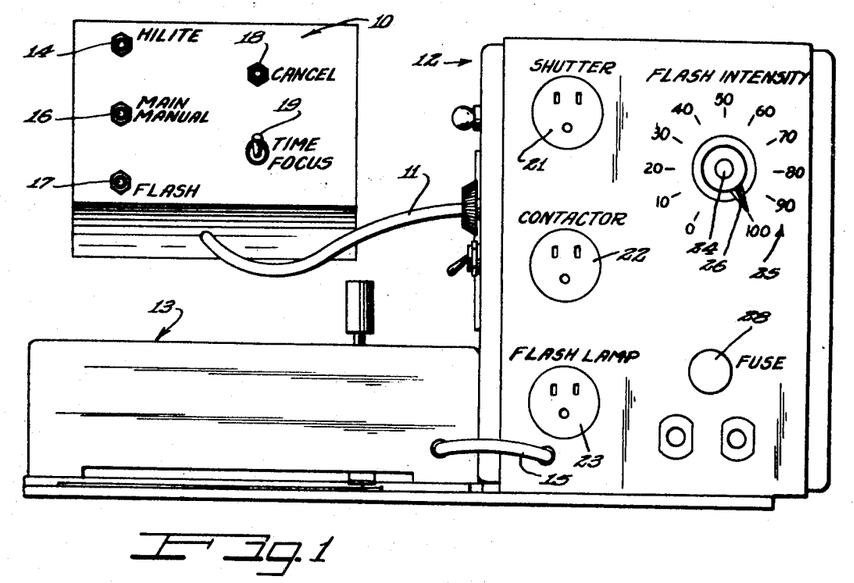
FIG. 1 illustrates the three units of the invention.

FIG. 1 illustrates the photographic apparatus of this invention comprising a control unit 10 which is attached by a flexible electrical cable 11 to the master timer unit 12. An evaluator unit 13 may be set remotely and then inserted into an electrical socket of the master timer unit 12. The units 12 and 13 have mating electrical sockets that may be engaged, but for purposes of illustration a cable 15 is shown connected between the units. The control unit 10 has a highlight switch 14, a main manual switch 16, a flash switch 17, a cancel switch 18 and a time-focus switch 19.

The end of the master timer unit 12 has a shutter output receptacle 21, a contactor output receptacle 22 and a flash lamp output receptacle 23. A flash intensity knob 24 has a pointer 26 which is readable against a numerical scale 25. A fuse 28 is also mounted in the end wall of the master timer unit 12.

Figure 2:
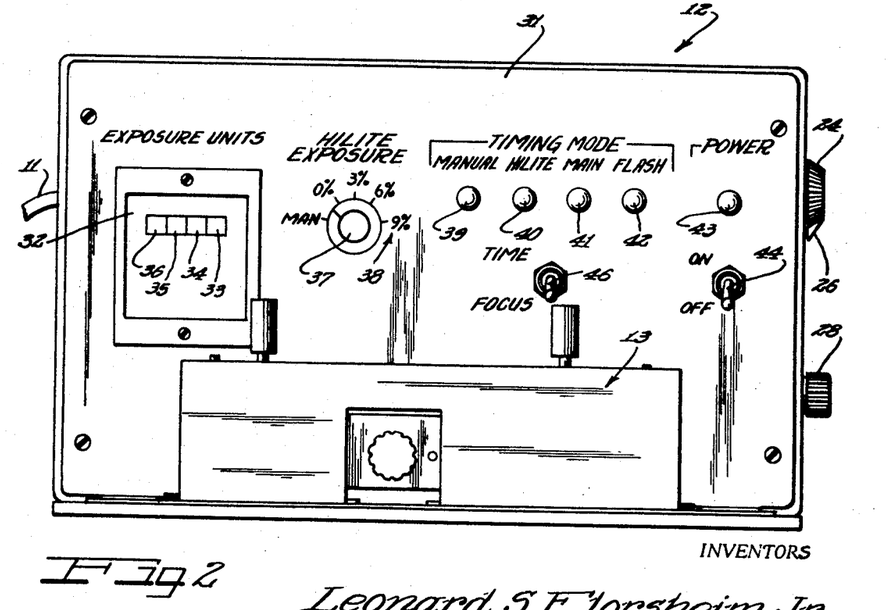
FIG. 2 is a front view of the master timer and a side view of the density setting unit.

The front panel 31 of the master timer unit 12 comprises an exposure unit 32 which has indicator wheels 33, 34, 35 and 36. A highlight exposure switch 37 may be set against indicia 38. Indicator lights 39, 40, 41, 42 and 43 indicate respectively, manual, highlight, main, flash and power. An on-off switch 44 and a timer-focus switch 46 are also mounted on the front panel 31 of the master timer unit 12.

Figure 3:
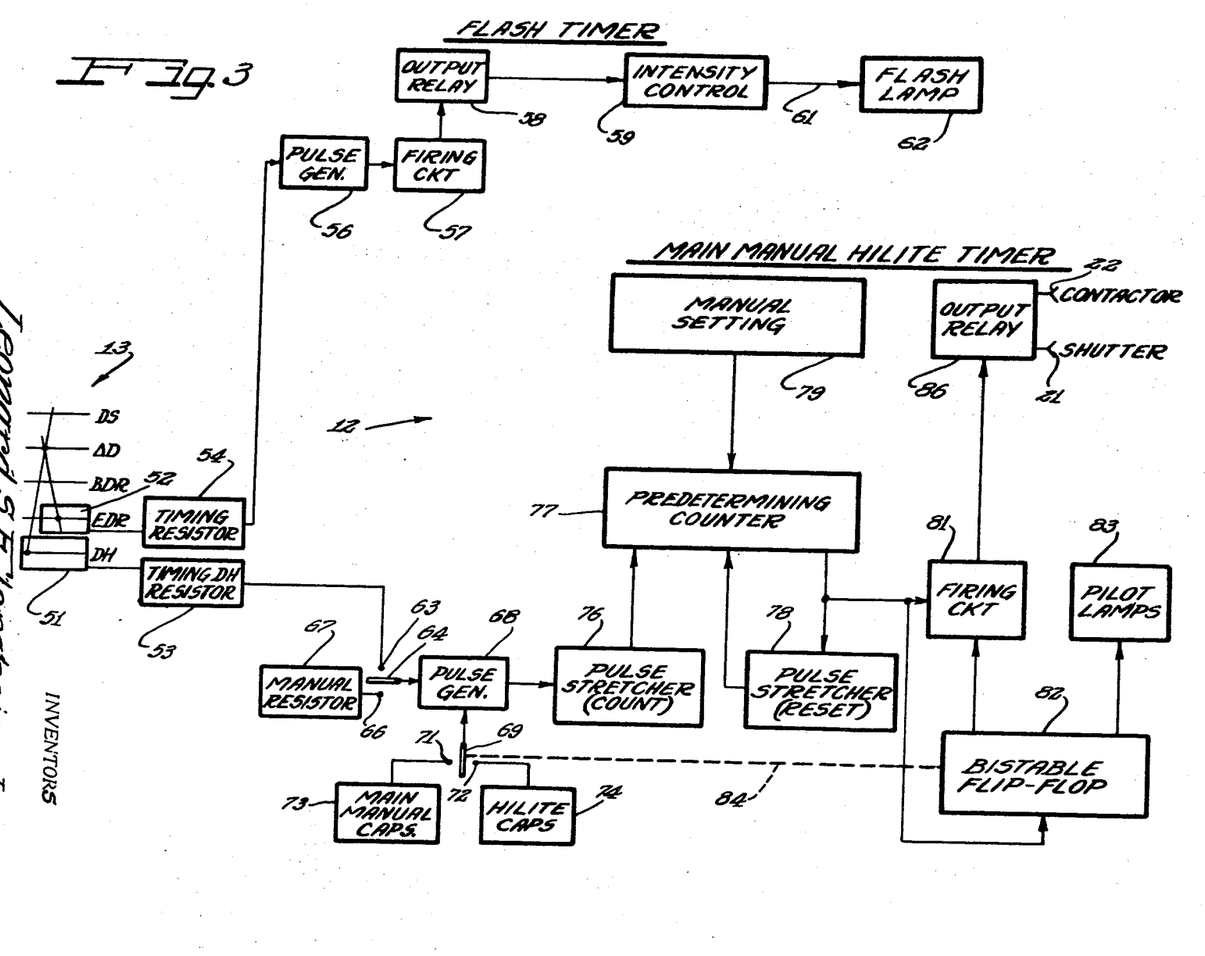
FIG. 3 is a block diagram of the apparatus of this invention.

FIG. 3 is a block diagram of the apparatus of this invention. The evaluator or key 13 is set to the proper highlight and shadow densities and automatically establishes a switch setting on the highlight density switch 51 and an excess density range (EDR) on a printed circuit wiper switch 52. The switches 51 and 52 are respectively connected to a highlight timing resistor bank 53 and an EDR timing resistor bank 54, and the switches 51 and 52 select a particular one of these resistors. The key actuates electrical circuits in the control unit 10. The EDR timing resistor 54, selected by the particular setting of the switch 52, is connectable to a pulse generator 56 which produces an output to a firing circuit 57 which in turn is connected to an output relay 58. The output of the relay 58 is supplied to an intensity control 59 which has an output lead 61 that is connected to the flash lamp 62. The timing resistor 54, which is selected by the EDR switch 52, determines the timing of the pulse generator 56 and thus the length of time that the firing circuit 57 is energized.

The highlight density switch 51 selects a particular timing highlight resistor 53 and supplies it to a contact 63 engageable by a moveable switch 64. The switch 64 may also be moved to engage a contact 66 which is connected to a manual resistor 67. A pulse generator 68 is connected to the switch contact 64 and receives an input from a switch 69 that is moveable between contacts 71 and 72 that are respectively connected to main manual capacitors 73 and highlight capacitors 74.

A pulse stretcher 76 receives the output of the pulse generator 68 and supplies an input to a predetermining counter 77 which also receives an input from a reset pulse stretcher 78. The predetermining counter also is connected to a manual setting 79. A firing circuit 81 is connected to the output of the predetermining counter 77 and also receives an input from a bistable flip-flop 82 which provides an output to pilot lamps 83. The flip-flop has a linkage 84 that connects it to the contact 69.

An output relay 86 is connected to the output of the firing circuit 81 and shutter plug 21 and contactor plug 22 are energized by the output relay 86.

Figure 5:
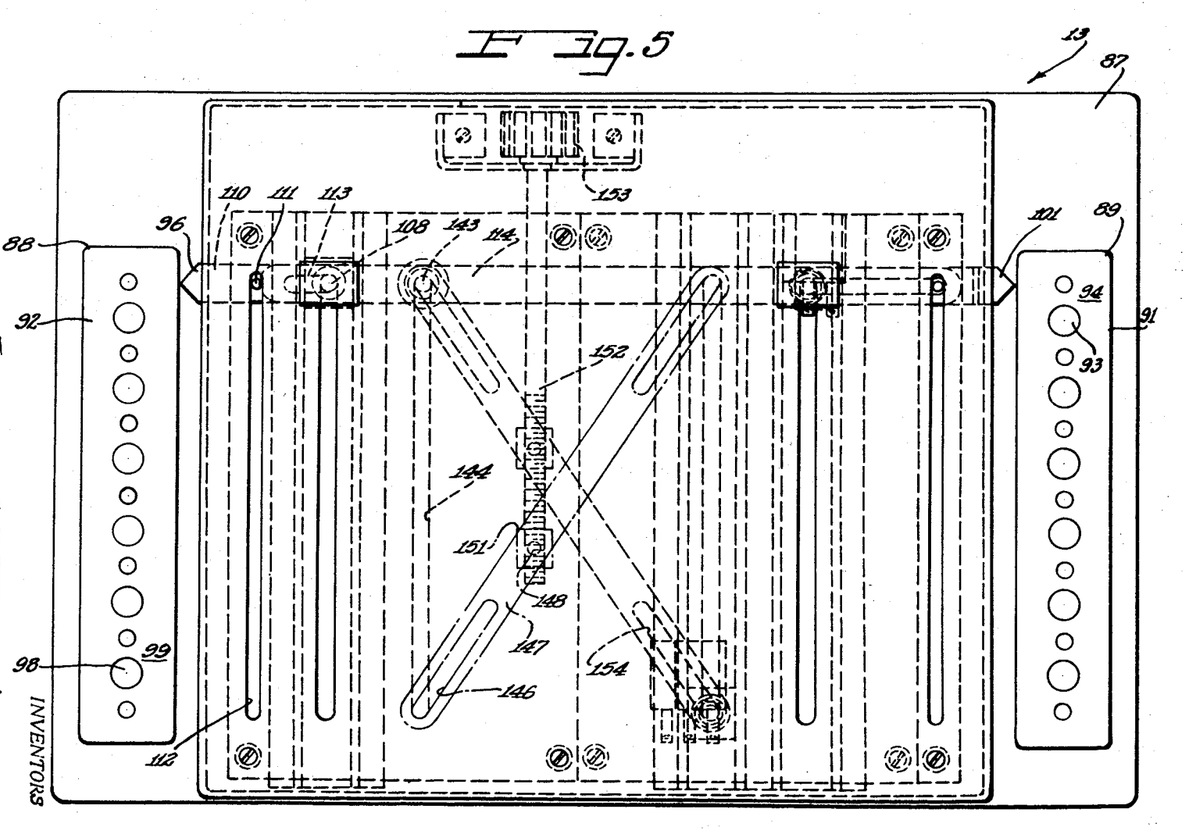
FIG. 5 is a top view of the evaluator of the invention.
Figure 6:
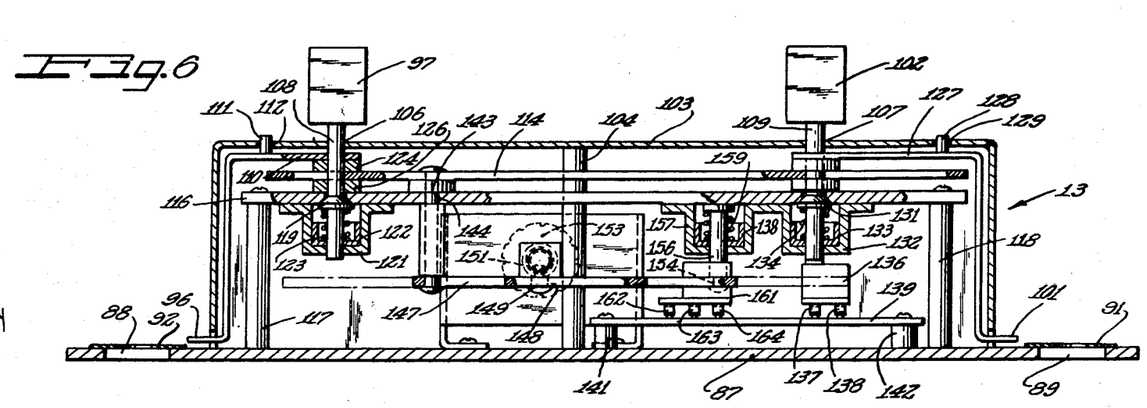
FIG. 6 is a sectional view of the evaluator.
Figure 7:
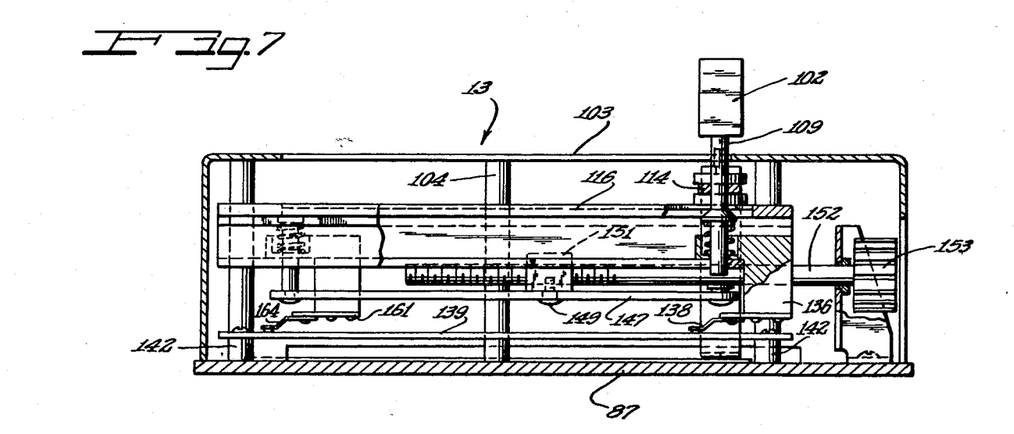
FIG. 7 is a sectional view taken at right angles of FIG. 6.

FIGS. 5, 6, and 7 illustrate the evaluator 13. The unit has a base plate 87 which is formed with a pair of windows 88 and 89, respectively, into which a shadow density scale 91 and a highlight density scale 92 are respectively receivable. For example, the shadow density scale 91 is formed with a plurality of windows 93 and the area surrounding the windows 93 become progressively darker from the top of the scale relative to FIG. 5, toward the bottom. Thus, if the density evaluator 13 is placed over a copy or similar original to be photographed, the darkest portion of the copy may be matched through one of the windows 93 with the area 94 adjacent that particular window. A pointer 96 is slidably moveable relative to the evaluator 13 and has a knob 97 for controlling it.

The highlight density scale 92 is formed with windows 98 and the area 99 surrounding the windows 98 becomes progressively darker from the top to the bottom, relative to FIG. 5, to allow the highlight density of a copy to be matched with one of the areas 99 through a window 98. A pointer 101 is slidably mounted in the evaluator 13 and may be controlled by a knob 102.

A cover plate 103 is attached to the base plate 87 by supporting standoff 104. The cover plate 103 is formed with a pair of slots 106 and 107, respectively, through which the shafts 108 and 109 extend. Shaft 108 carries knob 97 and shaft 109 carries knob 102. Shaft 108 carries the upper end 110 of pointer 96 and a guide pin 111 is attached to portion 110 and rides in a slot 112 in the cover plate 103. The shaft 108 passes through a slot 113 formed in a transverse link 114. The shaft then passes through a support plate 116 which is supported from the base plate 87 by standoffs 117 and 118. A slot is formed in the support plate 116 and the shaft 108 has an enlarged portion 119 that rides in the beveled slot of plate 116. A channel guide 121 is connected to the plate 116 and guides a follower block 122 through which the shaft 108 extends. A spring 123 is mounted between the enlarged portion 119 and the follower block 122. Washers 124 and 126 are mounted about shaft 108 above and below, respectively, linkage 114. The shaft 109 and pointer 101 are mounted similarly to shaft 108 and the upper end of pointer 101 has a portion 127 through which the shaft 109 extends and has a guide pin 128 which is receivable in a slot 129 of the cover plate 103. The shaft 109 extends through the support plate 116 and has an enlarged portion 131 which is received in the beveled slot formed in the plate 116. A channel guide 132 is attached to the plate 116 and carries a guide block 133 through which the shaft 109 extends. A spring 134 is mounted between the enlarged portion 131 and the guide block 133. A wiper contact 136 is attached to the lower end of shaft 109 and has a pair of wiper contacts 137 and 138 which engage tracks of a printed circuit board 139 mounted on suitable standoffs 141 and 142, respectively, from base plate 87. A pin 143 extends through an opening formed in link 114 and through a slot 144 formed in the support plate 116. The lower end of pin 144 passes through a slot 146 formed in a linkage 147. The shaft 109 passes through a slot in link 114. The link 147 is formed with an opening 148 through which a pin 149 is received. Pin 149 is connected to a pivot block 151 which may be adjusted by a lead screw 152 that is threadedly received through the guide block 151. A knob 153 is mounted on the lead screw 152 to control the position of the pivot point of the link 147. The other end of link 147 is formed with a slot 154 through which a pin 156 is received. Pin 156 is mounted in a channel guide 157 that is attached to the lower surface of the support plate 116 and has a follower block 158 and a spring 159. A wiper contact 161 is formed with three wiper contacts 162, 163 and 164, respectively, for engaging associated contacts on the printed circuit board 139, and moves with pin 156.

The structure of the evaluator 13 allows the contacts 137 and 138 to be set to a highlight density corresponding to the setting of the pointer 96 against the highlight density scale 92. Thus, the setting of the contacts 137 and 138 is directly determined by the highlight density setting of pointer 96 with knob 97.

On the other hand, the setting of the wiper contacts 162, 163 and 164 depend upon the settings of knobs 97 and 102 because the link 147 moves when both knobs 97 and 102 are moved. This may be observed by noting that with knob 102 stationary and knob 97 moving, the pin 143 will be moved through the link 114 to move the end of the linkage 147 and thus adjust the wiper contacts 162, 163 and 164. Alternatively, if the knob 97 is stationary and the knob 102 is moved, the link 114 will again move pin 143 in the slot 144, thus moving the linkage 147, and consequently the wiper contacts 162, 163 and 164. The position of the pivot pin 149 may be adjusted with the knob 153. This adjustment is made for particular conditions which exist with particular equipment and, once set for a particular set of conditions, remain fixed.

Figure 4A:
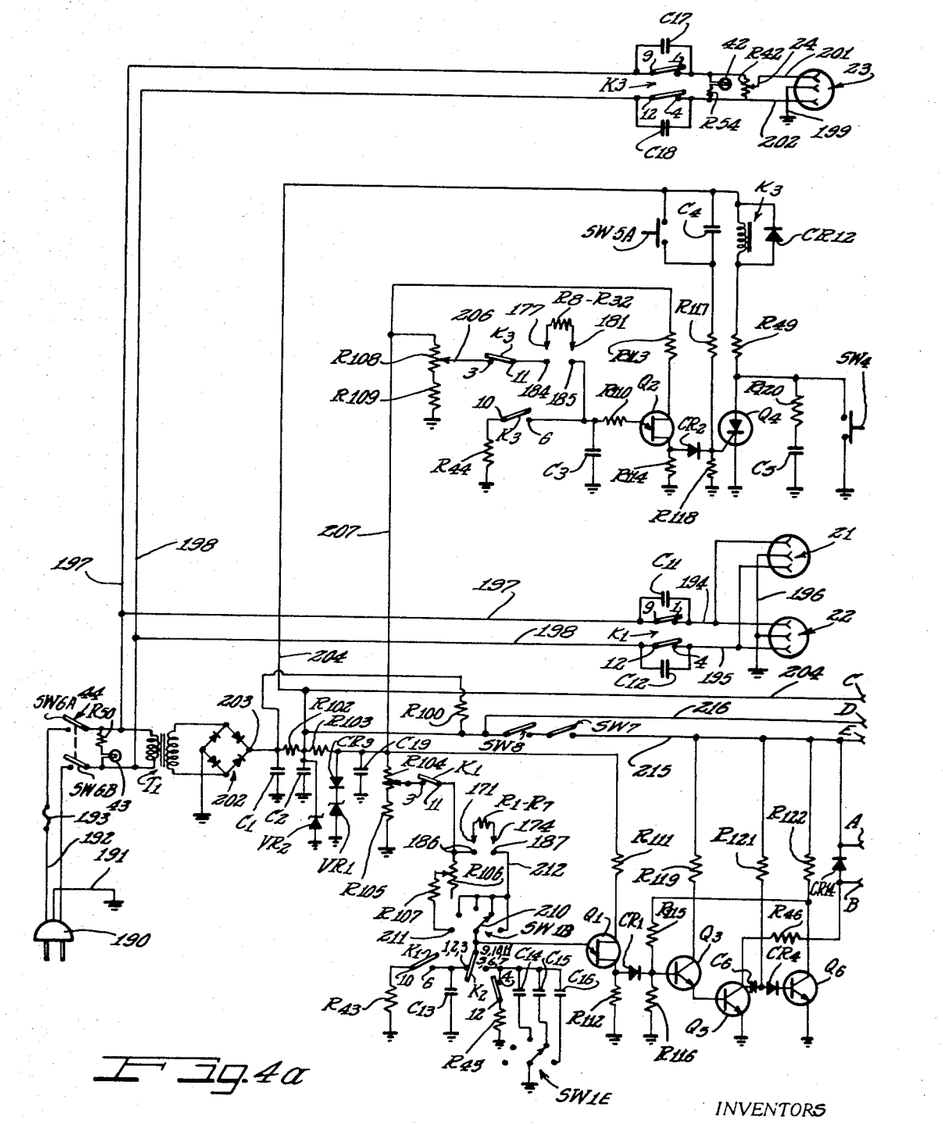
Figure 4B:
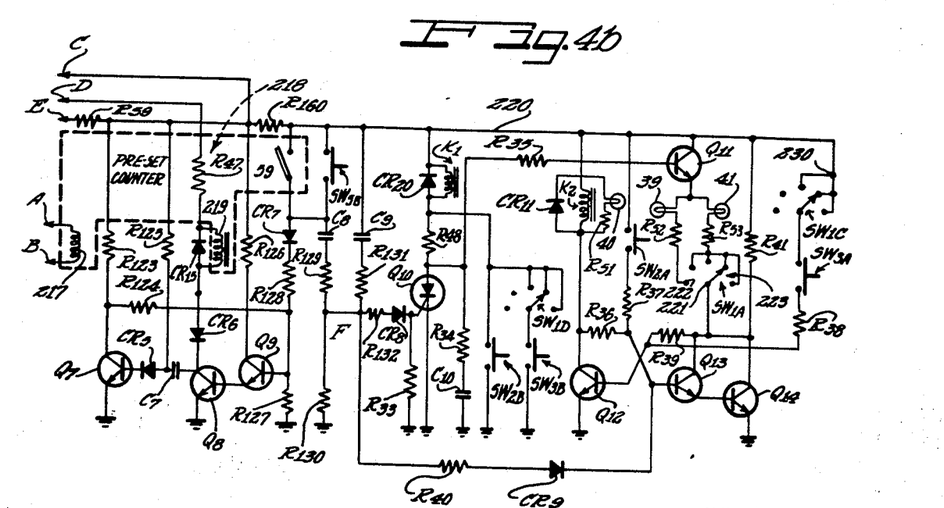
Figures 4C, 4D:
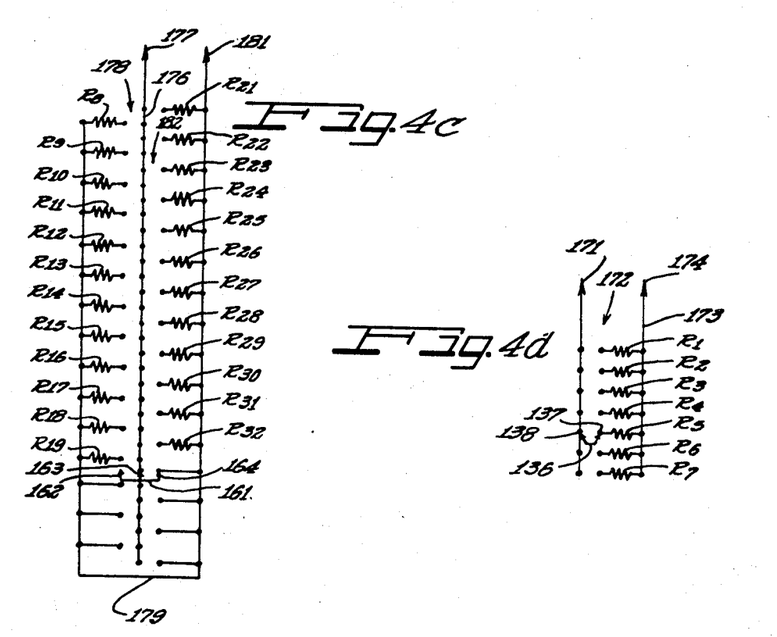

FIGS. 4c and 4d illustrate the contacts 136 and 161, respectively. These wiper contacts move along printed circuit boards to selectively place different resistances in circuit for the timing device. The values of these resistors determine the particular times for the various exposures. For example, the end 138 of slide contact 136 is in continuous engagement with a printed circuit bus which is connected to an output terminal 171. The other end 137 of contact 136, engages contacts 172 which are respectively connected to resistors $R_1 - R_7$, for example. The other end of the resistors $R_1 - R_7$ are connected to a bus 173 which connects to an output terminal 174. As shown in FIG. 4c, the slide contact 161 has a center contact 163 which engages a bus conductor 176 which connects to an output terminal 177. The wiper contact 162 engages a plurality of terminals 178 which are connected to first ends, respectively, of resistors $R_8 - R_{19}$. The other sides of resistors $R_8 - R_{19}$ are connected to a common terminal bus 179 which is connected to an output terminal 181. The wiper contact 164 engages a plurality of contacts 182 which are connected, respectively, to resistors $R_{21} - R_{32}$. The other end of resistors $R_{21} - R_{32}$ are connected to bus 179 and to output terminal 181. It is to be observed that the contacts 178 and 182 are staggered so that the resistors $R_8 - R_{19}$ and $R_{21} - R_{32}$ are alternately connected between the bus bar 176 and bus bar 179.

FIGS. 4A and 4b illustrate the master timer of this invention and it is to be noted that the resistors $R_8 - R_{32}$ are connected across the terminals 177 and 181 which engage, respectively, the terminals 184 and 185 in the master timer unit. These resistors control the timing for the flash exposure.

The resistor $R_1 - R_7$ connect to terminals 186 and 187, respectively. These resistors control the timing for the main and bump exposures.

FIGS. 4a and 4b illustrate the electrical schematic for the master timer unit 12. A power plug 190 is inserted into a suitable power supply and has a grounded terminal 191. One lead, 192, is connected to a fuse 193, and contacts of switches SW6A and SW6B are respectively connected to the power leads. The switches SW6A and SW6A are linked together and are controlled by the toggle on-off switch 44. A resistor $R_{50}$ and power-on light 43 are connected across the switches SW6A and SW6B. A transformer $T_1$ has its primary connected across the switches SW6A and SW6B. The shutter and contactor plugs 21 and 22 are connected in parallel across leads 194 and 195 and have grounded contacts 196. A relay $K_1$ controls switches between relay contacts 1 and 9 and 4 and 12, respectively, in leads 197 and 198. The capacitor C11 is across contacts $K_1$, 1 and 9 and capacitor $C_{12}$ is across contacts $K_1$, 4 and 12. AC power leads 197 and 198 also are connected to contacts 9 and 12 of relay $K_3$ which has contacts 1 and 4, respectively, that may be connected to contacts 9 and 12. A capacitor $C_{17}$ is connected across contacts 9 and 1, and a capacitor $C_{18}$ is connected across contacts 12 and 4. Flash lamp 42 and resistor $R_{54}$ are connected in series between contacts 1 and 4. A flash intensity potentiometer $R_{42}$ is controlled by knob 24. Flash lamp plug 23 has a grounded lead 199 and power leads 201 and 202 that are respectively connected to contacts 4 of relay $K_3$ and to the wiper contact on the potentiometer $R_{42}$.

The secondary of transformer $T_1$ is connected to a diode rectifier 202 which has one point grounded and the other point 203 connected to a capacitor $C_1$ which has its other side connected to ground. A lead 204 is connected from resistor 102 and to a capacitor $C_4$ which is across the switch SW5A. The resistor $R_{117}$ is connected to the switch SW5A and the capacitor $C_4$, and the other side is connected to the gate of a SCR $Q_4$ and to a resistor $R_{118}$ which has its other side connected to ground. The cathode of the SCR is connected to ground. The anode of the SCR is connected to a resistor $R_{49}$ which has its other side connected to the relay $K_3$ and a diode $CR_{12}$. The other side of the relay and diode $CR_{12}$ are connected to lead 204. A resistor $R_{120}$ is connected between resistor $R_{49}$ and a capacitor $C_5$ which has its other side connected to ground. A switch $SW_4$ is connected across the resistor $R_{120}$ and the capacitor $C_5$.

A diode $CR_2$ is connected between the gate of SCR $Q_4$ and one side of resistor $R_{114}$ which has its other side connected to ground. A transistor $Q_2$ has an electrode connected to the resistor $R_{114}$ and a diode $CR_2$ has an input electrode connected to the resistor $R_{10}$. The other side of the resistor $R_{110}$ is connected to terminal 185 and to a capacitor $C_3$ which has its other side connected to ground. Contact 6 of relay $K_3$ is also connected to contact 185, and contact 10 of relay $K_3$ is connected to resistor $R_{44}$ which has its other side connected to ground. Contact 184 is connected to contact 11 of relay $K_3$, and contact 3 of relay $K_3$ is connected to wiper contact 206 of potentiometer $R_{108}$. One end of potentiometer $R_{108}$ is connected to resistor $R_{109}$ which has its other side connected to ground. The other side of potentiometer $R_{108}$ is connected to lead 207. Lead 207 is connected to resistor $R_{113}$ which is connected to the third electrode of the semiconductor device $Q_2$. Lead 207 is also connected to a potentiometer $R_{104}$ which has its other side connected to a resistor $R_{105}$ which has its other side connected to ground. A capacitor $C_{19}$ is connected across the potentiometer $R_{104}$ and resistor $r_{105}$. A diode $CR_3$ and zener $VR_1$ are connected in opposite polarity across the capacitor $C_{19}$. A resistor $R_{103}$ is connected between lead 204 and lead 207. A capacitor $C_2$ and zener $VR_2$ are connected in parallel between ground and lead 204. The wiper contact of potentiometer $R_{104}$ is connected to contact 3 of relay $K_1$. Contact 11 of relay $K_1$ is connected to contact 186. Potentiometer $R_{106}$ is connected to contact 186 and has a wiper contact that connects to resistor $R_{107}$. Switch SW1B has moveable contact 210 for engaging a contact 211 that is connected to the other end of resistor $R_{107}$, and a plurality of contacts which are connected electrically to lead 212 which is connected to contact 187. Contact 210 is connected to terminals 9, 10 and 11 of relay $K_2$, and the moveable contact of the relay $K_2$ is moveable to engage contacts 1, 2 and 3 or 5, 6 and 7 of the relay. A capacitor $C_{13}$ is connected from contacts 1, 2 and 3 of the relay $K_2$ to ground. Contacts 10 and 6 of relay $K_1$ are connected between capacitor $C_{13}$ and resistor $R_{43}$ which has its other side connected to ground.

Contacts 4 and 12 of relay $K_2$ are connected between resistor $R_{45}$ which has its other side connected to ground and contacts 5, 6 and 7 of relay $K_2$. Capacitors $C_{14}$, $C_{15}$ and $C_{16}$ have first sides connected together and to contact 4 of relay $K_2$ and the other sides connected to contacts of switch SW1E. The wiper contact of switch SW1E is connected to ground.

A unijunction transistor $Q_1$ has its emitter electrode connected to contact 210. The first base of the unijunction transistor $Q_1$ is connected to a resistor $R_{11}$ which has its other side connected to lead 207. A resistor $R_{112}$ is connected between ground and the second base of the unijunction transistor $Q_1$. A diode $CR_1$ is connected from the second base of $Q_1$ to the base of transistor $Q_3$. A resistor $R_{116}$ is connected from the base of transistor $Q_3$ to ground. A resistor $R_{115}$ is connected from the base of the transistor $Q_3$ to the collector of a transistor $Q_6$. The emitter of transistor $Q_3$ is connected to the base of transistor $Q_5$ which has its emitter connected to ground. The collector of transistor $Q_5$ is connected to a capacitor $C_6$ which has its other side connected to diode $CR_4$. The emitter of the transistor $Q_6$ is connected to ground. The collector of transistor $Q_6$ is connected to a resistor $R_{122}$. The second sides of resistors $R_{119}$, and $R_{121}$ and $R_{122}$ are connected together to a lead 215. The lead 215 is connected to a switch $SW_7$ which is connected in series with a switch $SW_8$. A lead 216 is connected from switch $SW_8$ and resistor $R_{100}$ to a connection point D. Lead 204 is connected to a connection point C and lead 215 is connected to a connection point E.

FIG. 4b illustrates connection points A,B,C,D and E. The countdown coil 217 of a preset counter 218 is connected across terminals A and B. A transistor $Q_7$ has its emitter connected to ground and its collector connected to a resistor $R_{123}$ which has its other side connected to resistor $R_{59}$ which has its other side connected to point E. A transistor $Q_8$ has its emitter connected to ground and its connector connected to a capacitor $C_7$ which has its other side connected to a diode $CR_5$ which has its other side connected to the base of the transistor $Q_7$. A resistor $R_{125}$ is connected from the diode $CR_5$ and the capacitor $C_7$ to the resistor $R_{59}$. Point D is connected to the resistor $R_{47}$ that has its other side connected to parallel combination of the diode $CR_{15}$ and the reset coil 219 for the preset counter 218. Diode $CR_6$ is connected from the diode $CR_{15}$ to the collector of transistor $Q_8$. The transistor $Q_9$ has its emitter connected to the base of transistor $Q_8$ and its collector connected to a resistor $R_{126}$ which has its other side connected to point C. A resistor $R_{127}$ is connected from the base of the transistor $Q_9$ to ground. A resistor 160 is connected from point C to a switch $S_9$ which is the final count output of the preset counter 218. A diode $CR_7$ is connected to the switch $S_9$ and a resistor $R_{128}$ is connected to the other side of the diode. The other side of the resistor $R_{128}$ is connected to the base of the transistor $Q_9$ and to a resistor $R_{127}$ which has its other side connected to ground. A switch SW5B is connected between resistor $R_{160}$ and a capacitor $C_8$ which is also connected to the diode $CR_7$. Resistor $R_{129}$ and resistor $R_{130}$ are connected in series between ground and the other side of the capacitor $C_8$.

A capacitor $C_9$ and resistor $R_{131}$ are connected from resistor $R_{160}$ to a junction point F. A resistor $R_{132}$ and diode $CR_8$ are connected in series between the junction point F and the gate of an SCR $Q_{10}$. Resistor $R_{33}$ is connected from the gate of $SCR_{10}$ to ground. The cathode of $SCR_{10}$ is connected to ground. The anode of $SCR_{10}$ is connected to resistor $R_{48}$ which has its other side connected to the relay coil of relay $K_1$. A diode $CR_{20}$ is connected across the relay coil $K_1$. The other side of the relay coil $K_1$ is connected to resistor $R_{160}$. A capacitor $C_{10}$ and resistor $R_{34}$ are connected in series between ground and the anode of SCR $Q_{10}$, and the resistor $R_{35}$ is connected from resistor $R_{34}$ to the base of a transistor $Q_{11}$. The collector of transistor $Q_{11}$ is connected to lead 220 and the emitter of transistor $Q_{11}$ is connected to indicator lights 39 and 41. The switch SW1A has a moveable contact 221 which engages contacts 223 and 222, respectively. The resistor $R_{52}$ is connected between indicator light 39 and contact 222, and the resistor $R_{53}$ is connected between indicator light 41 and contact 223. The contact 221 is connected to a resistor $R_{39}$ and the collectors of transistors $Q_{13}$ and $Q_{14}$. The emitter of transistor $Q_{14}$ is connected to ground. The emitter of transistor $Q_{13}$ is connected to the base of transistor $Q_{14}$. The base of transistor $Q_{13}$ is connected to the cathode of diode $CR_9$ which is in series with a resistor $R_{40}$ that has its other side connected to point F. A transistor $Q_{12}$ has its emitter connected to ground and its base connected to resistor $R_{39}$ and a resistor $R_{38}$. Transistor $Q_{12}$ has its collector connected to the energizing coil of relay $K_2$ which has its other side connected to lead 220. A diode $CR_{11}$ is connected in parallel with relay $K_2$ and a highlight indicator lamp 40 and resistor 51 are connected in series across the relay coil $K_{12}$. A resistor $R_{36}$ is connected from the collector of transistor $Q_{12}$ to the base of a transistor $Q_{13}$. A resistor $R_{37}$ is connected from the base of transistor $Q_{13}$ to a switch SW2A. The other side of switch SW2A is connected to lead 220. A resistor $R_{38}$ is connected from base of transistor $Q_{12}$ to the switch SW3A. The other side of switch SW3A is connected to the moveable contact of switch SW1C. Contacts 230 of switch SW1C are connected to lead 220.

In operation, the toggle switch 44 is moved to "on" position closing switches SW6A and SW6B. This supplies a pulse to the power supply which turns SCR $Q_{10}$ on. This pulse is differentiated by capacitor $C_9$, resistor $R_{131}$, resistor $R_{132}$ and diode $CR_8$. This energizes relay $K_1$ which opens contacts 1 and 9 and 4 and 12. Relay $K_1$, when energized, closes contacts 6 and 10 providing a discharge path for any residual voltage on timing capacitor $C_{13}$. Relay $K_1$ also opens contacts 3 and 11, disconnecting the power supply from the timing network. The electronic circuitry has been cocked with these operations.

It is to be realized, of course, that a suitable shutter and light source energizer has been connected to the shutter plug 21 and the contactor plug 22. For main exposure, the switch 16 is depressed. This closes switch SW2B which turns off SCR $Q_{10}$. Switch SW2B is mechanically linked to switch SW2B and is simultaneously depressed. Switch SW2A places transistors $Q_{13}$ and $Q_{14}$ of the flip-flop, which they form a part, in the "on" state and turns off transistor $Q_{12}$. This holds transistors $Q_{13}$ and $Q_{14}$ in the "on" state.

When switches SW2A and SW2B are released, relay $K_1$ becomes deenergized and transistor $Q_{11}$ turns on light 41. Contacts 9, 1 and 12,4; and 3, 11 and 10,6 of relay $K_1$ close when the relay $K_1$ is deenergized. This supplies power to the contactor plug 22 and the shutter plug 21, and the shutter and the lights for the main exposure will be turned on.

The capacitor $C_{13}$ will discharge to peak firing voltage of transistor $Q_1$ through the selected resistor $R_1 - R_7$. When the transistor $Q_1$ fires, a pulse is created at resistor $R_{112}$ which turns on transistors $Q_3$ and $Q_5$, which pulls in the coil 217 of the preset counter. The count coil is held in until the capacitor $C_6$ charges through resistor $R_{121}$ to turn on transistor $Q_6$ & turns off transistors $Q_3$ and $Q_5$.

The preceding process is repeated until the latching relay of the preset counter turns to zero. The latching relay is preset. A standard Hecon counter is used. Such units are commercially available and only the count coil, reset coil and final-count output are illustrated in the drawings.

When the end of the count is reached to which the counter has been preset, the switch $S_9$ closes applying base voltage turning on transistors $Q_9$ and $Q_8$ which turns off transistor $Q_7$ and pulls in reset coil 219 resetting the counter back to the predetermined setting. Reset current is released when capacitor $C_7$ charges through resistor $R_{125}$ to turn transistor $Q_7$ back on and to turn transistors $Q_8$ and $Q_9$ off. Switch $S_9$ also creates pulses through capacitor $C_8$, resistors $R_{129}$ and $R_{132}$, diode $CR_8$ and resistor $R_{33}$ which turns on SCR $Q_{10}$. This again energizes relay $K_1$ opening the associated contacts of relay $K_1$ which were closed when the relay was deenergized.

When the voltage at the SCR drops to holding voltage, (about ½ volt), the transistor $Q_{11}$ will be turned off which turns indicator light 41 off. This completes the main automatic exposure.

For the highlight exposure, switch 14 is depressed which corresponds to switches SW3A and SW3B on the electrical schematic. Switch SW3A, when depressed, turns on transistor $Q_3$ through resistor 38 thus turning light 40 on and energizing relay $K_2$. When relay $K_2$ is energized, contacts 9, 10 and 11 are connected, respectively, to contacts 5, 6 and 7, connecting one of the three capacitors $C_{14}$, $C_{15}$ and $C_{16}$ in circuit, which has been selected by switch SW1E that is controlled by knob 37 and which selects the percentage of highlight. The relay contacts 4 and 12 are opened removing the discharge path from the selected capacitors $C_{14}$, $C_{15}$ and $C_{16}$. Simultaneously, switch SW3B opens relay $K_1$ and the remaining operation for the highlight exposure is similar to that explained above when the main exposure is being made, except the time will be a percentage of the main exposure due to the placing of the highlight capacitors $C_{14}$, $C_{15}$ or $C_{16}$ in the circuit.

In manual position, however, zero percent highlight, switches SW1B, SW1C and SW1E all provide open circuits and no highlight exposure can occur.

In manual position, the predetermined setting of the Hecon counter controls the timing. The timer will work without the computer resistors $R_1 - R_7$ inserted. The pulse repetition rate of transistor $Q_1$ and its timing network $R_{107}$ and capacitor $C_{13}$ is fixed at 10 hertz which provides an accuracy of one-tenth second as indicated on the counter dial 32.

For flash exposure, switch 17 is depressed which corresponds to switch SW4. This turns SCR $Q_4$ on, and deenergizes relay $K_3$. Contact 11 is connected to contact 3 of relay $K_3$ and contacts 10 and 6 are opened removing the discharge path. Capacitor $C_3$ charges to the peak point firing voltage of unijunction transistor $Q_2$ through the selected EDR resistors $R_8 - R_{32}$. Resistor $R_{110}$ limits the current through the unijunction transistor $Q_2$. As transistor $Q_2$ fires, pulses are created across resistor $R_{114}$ which are applied to the gate of SCR $Q_4$ through diode $CR_2$ across resistor $R_{118}$. SCR $Q_4$ fires, energizing relay $K_3$. The relaxation oscillator fires only once during the timing interval. When contacts 9, 11, 12 and 4 of relay $K_3$ are closed during the timing interval, power is applied to light 42 and to leads 201 and 202 which is connected to the flash lamps (not shown). The potentiometer $R_{42}$ allows the intensity of the lamps to be adjusted.

Thus, it is seen that the evaluator illustrated in detail in FIGS. 5, 6 and 7, after setting the BDR adjustment, may be placed over a copy to be photographed and pointer 101 set to read the shadow density and the evaluator will then be moved and pointer 96 set to read the highlight density. This will move the slide contacts 136 and 161, respectively, so that a pair of resistance values will be chosen depending upon the particular position of the contacts 136 and 161. This will be supplied through leads 170 and 173 through terminals 186 and 187, illustrated in FIG. 4a of the master timer. The resistance values selected by slide contact 161 will be fed by leads 176 and 179 to contacts 184 and 185 in FIG. 4a. It is to be realized that the resistors may be mounted on the printed circuit board which the contactors 138 and 164 are in engagement, or they might alternatively be mounted within the master timer and a connection made between the evaluator unit and the master timer so as to choose a particular resistance value. Thus, the invention allows the evaluator, which may be compact, to be moved about to make evaluations of the highlight and shadow densities. It is to be particularly noted that the resistor $R_1 - R_7$ is directly chosen by the slide contact 136. However, the slide contact 161 is positioned depending upon the motion of both knobs 97 and 102. This is because the resistance value across the slide contact 161 is the excess density range which is calculated from the highlight density and shadow density settings. This is the purpose for the various linkages in the evaluator illustrated in detail in FIGS. 5, 6 and 7.

Although minor modifications might be suggested by those versed in the art, it should be understood that we wish to embody within the scope of the patent warranted hereon all such modifications as reasonably and properly come within the scope of our contribution to the art.

We claim as our invention:

1. In combination with a process camera having a shutter, camera lights and flash lamp, an automatic density-setting apparatus comprising: an evaluator having two pre-positionable parts which are respectively movable with respect to one another as well as with respect to said evaluator; means to move said two parts as a function of selectively matched steps of a gray scale to the selected highlight and shadow densities of copy material; means responsive to the relative prepositioning of two parts to generate electrical signals; and, a master control unit including a master timer responsive to said electrical signals for automatically regulating the shutter, camera lights and flash lamp of the camera in order to provide properly exposed main, flash and bump exposures automatically and instantaneously.

2. In combination, a graphic arts camera having a variably timed shutter; a flash lamp for said camera arranged and disposed for effecting a flash exposure; camera lights for illuminating copy material to be exposed in said camera; and, an automatic density-setting apparatus operatively associated with said camera comprising an evaluator having first and second movable parts which are also relatively movable with respect to one another; means for adjustably presetting said parts as a function of intelligence corresponding to highlight and shadow densities of a material to be copied whereby the intelligence is converted and stored in said evaluator in terms of a mechanical spatial relationship of said first and second part; means for converting said mechanical spatial relationship of said evaluator into electronic signals; and, control means including a master timer responsive to said electronic signals to automatically regulate the shutter, camera lights and flash lamp of the camera.

3. For use in an automatic density setting apparatus of a graphic arts process camera for automatically calculating main, flash and bump exposures; a portable evaluator having a pair of separately movable parts each having its own gray scale consisting of a plurality of gray scale steps; and, adjustment means for each of said parts whereby an intelligence corresponding to the highlight and shadow densities of copy material may be converted and stored in said evaluator by physically prepositioning the two parts in selected positions corresponding to a selectively matched gray scale step.

4. In combination, a graphic arts camera having a shutter, camera lights and flash lamp, a computer for automatically calculating main, flash and bump exposure times in half-tone process photography,
    said computer comprising an evaluator for evaluating an image to be reproduced and settable for various conditions,
    a main control unit including a master timer controlled by the set condition of said evaluator,
    said evaluator being separably connected to said main control unit,
    and said evaluator having a pair of movable means settable respectively to the highlight and shadow densities of said image,
    whereby the setting of said scales determine various exposure times in said main control unit.

5. The method of camera control which includes the steps of relating an evaluator to the surface of material to be copied,
    physically prepositioning two prepositionable parts with respect to one another as well as with respect to said evaluator as a function of selectively matched steps of a gray scale to the selected highlight and shadow densities of the copy,
    generating electrical signals as a function of the relative prepositioning of said prepositionable parts, and automatically regulating the shutter, camera lights and flash lamp of the camera in response to said electrical signals in order to provide properly exposed main, flash and bump exposures automatically and instantaneously.

6. The method of operating a graphic arts camera having a variably timed shutter, bump and flash operations and standard camera lights which includes the steps of:
    adjustably presetting an evaluator having first and second movable parts which are also relatively movable with respect to one another as a function of two bits of intelligence corresponding to highlight and shadow densities of a material to be copied,
thereby converting and storing the intelligence bits in a mechanical spatial relationship of the first and second parts,
    converting the mechanical spatial relationship into electronic signals,
    and electrically regulating the shutter, bump and flash operations of the camera as a function of the electronic signals.

7. In combination with a process camera, a computer for automatically calculating main, flash and bump exposure times in half-tone process photography,
    said computer comprising an evaluator for evaluating an image to be reproduced and settable for various conditions,
    a main control unit controlled by the set condition of said evaluator,
    said evaluator being separably connectible to said main control unit and having a pair of movable gray scale means that may be set to the highlight and shadow densities of the image,
    the setting of said scales determining various exposure times in said main control unit,
    whereby the exposure times are automatically calculated for electrically regulating said process camera.

* * * * *